Figure 1:
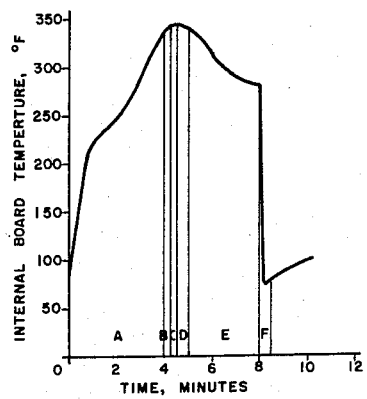

March 15, 1960  G. E. CHAMBERLIN ET AL  2,928,129
PROCESS FOR THE MANUFACTURE OF PRIMER COATED FIBER BOARD
Filed May 13, 1957

*INVENTORS*
GEORGE E. CHAMBERLIN
RUSSELL E. KNUTSON
BY

United States Patent Office 2,928,129
Patented Mar. 15, 1960

2,928,129

PROCESS FOR THE MANUFACTURE OF PRIMER COATED FIBER BOARD

George E. Chamberlin and Russell G. Knutson, International Falls, Minn., assignors to Minnesota and Ontario Paper Company, Minneapolis, Minn.

Application May 13, 1957, Serial No. 658,737

10 Claims. (Cl. 18—47.5)

This invention relates to the production of resinous fibrous compositions from a combination of fibrous material and a binder, which composition is susceptible to consolidation under heat and pressure to produce products having physical properties particularly suitable for structural use and other purposes.

This invention also relates to what is known in the construction industry as hot press products and, in particular, as sheet lumber. This invention has particular reference to a method of manufacturing sheet products from ligno-cellulose material by forming such material into a layer or pad that is compressed and the fibrous and binding material coalesced or bonded under the action of heat and pressure such as might be obtained, for example, by subjecting the material to compression in a hot platen press or by passing it between hot rollers and causing it to be subjected to heat and pressure thereby.

The present method anticipates that the ligno-cellulose material may be finely divided by any suitable method as long as all or substantially all the lignin is retained. The vegetable material may be prepared in any suitable way such as grinding, exploding or what is known as semi-chemical process. The sheeted material of the invention is capable of being consolidated to produce products having a relatively wide range of thickness, for example, about 1/8" to about 1".

The final products of the invention are generally thermoplastic rather than thermosetting or thermocuring type. The consolidated product is highly resistant to water and moisture.

In the invention there is employed in combination with ligno-cellulose material a plastic resinous material which is relatively inexpensive and available in large quantity and which, when properly combined with the fibers and consolidated under heat and pressure, results in products of relatively considerable resistance to the absorption of moisture and warping and which, together with a pleasant appearance, have desirable structural properties particularly in respect to rigidity and resistance to cracking or breakage.

With the foregoing and other objects in view the invention consists of the novel steps and combination of steps hereinafter more specifically described and illustrated in the accompanying drawings wherein is shown the embodiment of the invention. It is to be understood that changes, variations, and modifications may be resorted to which fall within the scope of the claims hereto appended.

The invention in particular comprehends a series of related steps in which a resinous material is incorporated by suitable means such as a refiner or beater with finely divided ligno-cellulose of fibrous stock in such a manner as to permit formation into a continuous sheet. Resin or resinous material is combined with any desired ligno-cellulose material which may be fibrous stock or pulp in a refiner or some equivalent device in such a manner as to distribute the resin throughout the mass. The fibrous material containing the binder is formed into board-like products.

Extracted pine wood pitch may constitute the resin employed in making the sheet lumber. Such resins are referred to as pine wood pitches or resins obtained by extraction of pine wood and contain oxidized resin, oxidized abietic acid, oxidized terpenes, polyphenols, polymerized terpenes. These resins are briefly but more fully described in Patent No. 2,060,856 issued to John M. De Bell and will be referred to hereinafter as extracted pine wood pitches or resins.

Pine wood pitch resin which may be employed comprises a residue low in abietic acid remaining after the separation of refined resin high in abietic acid from the resinous material. Other resinous materials may be used in place of the extracted pine wood pitch. A petroleum resin having the following properties gives excellent results:

Physical

Softening point, ball and ring _____ 212±10° F.
Specific gravity @ 25/25° C _____ .970–.975
Refractive index @ 20° C _____ 1.5116

Chemical

Acid number _____ Less than 1
Saponification number _____ Less than 2
Iodine value (WIJS) _____ 120
Iodine value (corrected for substitution) _____ 30
Bromine number _____ 7.3
Molecular weight _____ 1100
Double bonds per mol. (bromine number) _____ 1

The petroleum resin may be used alone or in combination with compatible materials. An example of a suitable resin is Pennsylvania Industrial Chemical Corporation's "100% polymerized petroleum resin."

The fibrous material or pulp may be of any convenient type capable of being formed into sheets or layers, it being understood by those skilled in the art that the characteristics of the final product will depend in some degree upon the stock employed.

Figure 2:
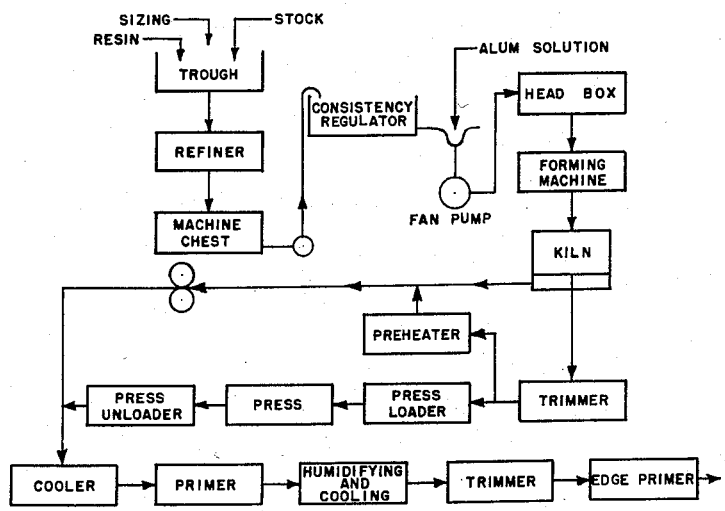

The preferred steps of carrying out the invention are illustrated in the accompanying drawing where:

Figure 1 is a graphical illustration of the pressing, priming, cooling and humidifying steps; and, Figure 2 is a diagrammatical illustration of the steps for producing the product and carrying out the process.

It is preferred that pine wood resin having a melt point of about 220 to 239° F. ball and ring method, or a petroleum resin having a softening point of about 212° F. ±10° F. be used. Products having good structural properties have been formed from pulp mixtures containing a quantity of resin within the range of about 5 to 100%, preferably within the range of about 10 to about 30%, based upon the dry weight of the fiber.

In accordance with the invention the fibrous pulp of the desired type is fed into a trough containing the pulp stock and, about the same time, suitable sizing material is added. The resin may be added in a powdered form, in the form of a slurry, or in the form of emulsion. After the resin has been added to the pulp stock it is preferred that the stock containing these materials be passed through a suitable refiner. The stock from the refiner is directed to a suitable chest from which the material is fed to a forming machine. In the preferred process the consistency of the material from the chest is adjusted and then alum solution or its equivalent is added. The thickness of the sheet formed depends upon the thickness of the end product. The degree of drying depends upon whether the board is to be consolidated in a hot platen press or be passed between rollers. If it is to be pressed by passing it through rollers, the temperature of the board should be slightly in excess of the melt point of the resin incorporated therein as the board time between the heated rollers is relatively short.

If the board is to be consolidated in a hot platen press, it is trimmed to the desired size, fed into the press, and then subjected to heat and pressure to consolidate the product. Regardless of how the product is consolidated the temperature of the consolidated product must not exceed by about 50° F. the melt point of the resin in the prime coating material at the time the prime coating is applied. The prime coating is dried in part by use of the internal heat of the hot press product. This requires a relatively short time, for example, if the temperature of the product at the time of priming is 300° F. The internal heat will dry the prime coating in less than about 3 minutes.

If the resin used is thermoplastic it must be quickly cooled to obtain the best results and efficiently set up the resin.

The board at the completion of the pressing steps is generally dry, that is, contains about 1% of moisture or less. The normal moisture content of such product when used generally falls within the range of 2 to 6%. The additional moisture may be absorbed from the atmosphere or may be added by humidifying. Absorption of moisture from atmosphere to equalize the moisture often results in warping or curling of the hot press product. To overcome this tendency the board should be humidified and according to this process the product is humidified during cooling. The humidifying may be accomplished by an aqueous spray or bath. For best results, quickly drop the temperature of the pressed product to below 100° F. in about 60 seconds or less. By humidifying at the time of cooling a better and more stable product is obtained.

As shown in Figure 1 the temperature of the board going into a platen press is in the neighborhood of 70 to 75° F. and the pressing time is about 4 minutes with the pressure being such as to obtain a product of the desired density. Time for removing and cooling the hot press product requires about 60 seconds. The product can be prime coated while the board contains considerable heat. The total time for applying the prime coating and drying of the coating is about 3 minutes. The cooling and humidifying requires 20 to 30 seconds if the board has a temperature of about 250 to 300° F. before cooling and, if the board is to contain about 2 to 8% moisture after humidifying and cooling.

The temperature of the platen press or heated rollers which is to consolidate the product may vary considerably as internal temperature of the board is the controlling factor. For example, the temperature of the rollers may be as much as 475° F. at the time this pressure is applied, if the heat is not sufficient to raise the internal temperature substantially above 350° F. When employing the platen press the temperature of the platen cannot be substantially higher than that desired in the internal temperature of the board, if the board is to remain in the press for several minutes. Of course, the moisture contents of the board being pressed must be taken into consideration in determining the time in the press.

The following is an example of making an exterior covering product such as siding having a density of about 30-35 pounds per cubic foot and a thickness of about 7/16″: Add resin to groundwood stock; form board and dry; cut dried board to the desired size; press; at least partially cool board; apply prime coating to hot board; dry coating; and then humidify and cool the board. The resin is screened to remove any lumps formed in the resin and then the resin, either as powder or as a water slurry, is added to the pulp stock at a place where it will be intimately mixed therewith. One such place for adding the pitch or resin is the machine trough which would permit the resin and the stock to be intimately mixed as it passes through the refiner and before it goes to the machine chest. If the resin is to be added as a water slurry a mixing tank in which vigorous agitation is maintained should be used. After the board is formed and dried one of the following methods may be used for hot pressing the resin impregnated ligno-cellulosic board:

(1) *Hydraulic press.*—Dried board is trimmed to about the width of the hydraulic press; board pressed to 7/16″ stops by applying approximately 100 pounds pressure per square inch for 4 minutes or longer at a platen temperature of about 465° F.

(2) *Roller press.*—When this method of pressing is employed, the board should be at a temperature of about 350° F. at the time of passing between the hot rollers. The temperature is required to permit adequate degree of resin flow in the pressing cycle. The temperature of the press rollers should be in excess of about 450° F. if the diameter of the pressing rollers is 4 feet and the linear speed about 48 feet per minute.

Example of suitable priming material:

750 grams of varnish with driers
870 grams of $BaSO_4$
140 grams of clay
140 grams of talc
350 grams of $TiO_2$ The varnish consists of 100 pounds of fusible type phenolic resin and 40 gallons of tung oil. As an example of such resin Hercules B-25 gives excellent results and, in fact, modified phenol resins as described in chapter 10 of Synthetic Resins by Ellis, copyrighted 1935, may be used.

The driers are added to the varnish and may consist of .5% of lead, .05% of cobalt, .05% of manganese as metals based upon the oil content. Generally, it is preferred to add 0.5% of a suitable anti-skinning agent. This is based upon the varnish solids. The temperature of the hot pressed board should not be in excess of about 300° F. at the time the prime coating is applied. If the board temperature is considerably in excess of 300° F. the board should be sprayed with water to reduce the temperature to around 300° F. and then the priming material applied. The priming material will dry by the internal heat of the board in less than about 3 minutes. The cooling of the board before priming results in a better cure of the coating material and color change thereof. After the board has been primed and dried it is treated with water to reduce the temperature of the board to below about 100° F. in a period of time not to exceed about 30 seconds. This sets the resin efficiently and humidifies the board so that it contains about 2 to about 8% of moisture.

It is to be understood that the contents of the priming material may be changed without departing from the scope of the invention.

Example of the board contents:

| Fiber Furnish | Platen Press | Roller Press |
|---|---|---|
| Groundwood stock, percent | 80 | 70 |
| Resin, percent | 20 | 30 |
| Wax and resin sizing, percent | 1.6 | 1.6 |
| Alum, percent | 0.75 | 0.75 |

The process includes the incorporation of a binder, preferably a thermoplastic binder, with finely divided ligno-cellulosic material, the forming of a board-like product from the mixture, drying the board-like product to reduce the moisture contents, consolidating the board-like product under heat and pressure to plasticize the binder and cause the plasticized binder to flow, applying prime coating to the hot board whereby the prime coating it at least dried, in part, by the internal heat of the board and then quickly reducing the temperature to 100° F. or lower in about less than about 3 minutes by the application of water to the hot coated board.

It is to be understood that the binder may be various kinds so long as it gives high strength and materially increases the water resistance of the hot pressed board-like product.

This application is a continuation-in-part of our co-pending application Serial No. 358,482, filed May 29, 1953, now abandoned.

What is claimed:

1. The process of producing hot pressed primed ligno-cellulosic board comprising hot pressing at a temperature in excess of 400° F. to about 475° F. a ligno-cellulosic mat containing a fusible resin; reducing the temperature of the hot pressed board to about 300° F., then applying a pigmented prime material containing fusible resin to the hot board, drying the priming material by the internal heat of the board for a period of less than about three minutes, and then quickly reducing in less than about sixty seconds the temperature of the hot board by application of water.

2. The process of producing hot pressed primed ligno-cellulosic board comprising hot pressing at a temperature in excess of about 400° F. to about 475° F. a ligno-cellulosic mat containing a thermoplastic resin, applying a prime material to the hot pressed board containing less than about 1% of moisture, permitting the priming material to dry by the internal heat of the board for a period of less than about three minutes, and then quickly reducing in less than about sixty seconds the temperature of the hot board by application of water.

3. Process of producing hot pressed primed ligno-cellulosic board containing a fusible resin including the application of a pigmented priming material containing a fusible phenolic resin to a hot pressed board while the temperature thereof is not in excess of about 50° F. above the melting point of the resin in the said priming material, permitting the priming material to dry by the internal heat of the board for a period of about three minutes, and then reducing the temperaure of the board by water in less than about sixty seconds from in excess of about 250° F. to about 300° F. to below about 100° F.

4. The process of producing the hot pressed primed ligno-cellulosic board comprising pressing a ligno-cellulosic mat containing a fusible resin at a temperature in excess of about 400° F. to about 475° F., applying a pigmented priming material containing a fusible resin to the hot board while the temperature thereof does not exceed about 50° F. of the melting point of the resin in said coating, permitting the priming material to dry by internal heat of the board for a period of not in excess of about three minutes, and then simultaneously reducing the temperature in less than sixty seconds and humidifying by the application of water to the primed board.

5. A process of producing primed hot pressed board containing a fusible resin, comprising applying a pigmented priming material containing a fusible resin to a hot compressed board, the temperature of the board upon application of the priming material not exceeding about 50° F. above the melting point of the resin of the priming material, permitting the priming material to dry by the internal heat of the board for not exceeding about three minutes, and then applying water to the primed board to reduce the temperature below about 100° F. and humidify the board.

6. The process of producing hot pressed primed ligno-cellulosic board containing a thermoplastic resin comprising applying a pigmented priming material to substantially bone dry hot board, having a temperature within the range of about 250° F. to about 300° F., drying the material by internal heat of the board for about three minutes, and then quickly reducing the temperature of primed board to below about 100° F. by application of water.

7. The process of producing hot pressed primed fiber-board containing a fusible resin comprising applying a pigmented coating containing a fusible phenolic resin to a pressed board having a temperature not in excess of about 50° F. of the fusible phenolic resin in the priming material, drying the priming material by internal heat of the board for not exceeding about three minutes, and then quickly reducing the temperature of the primed board in about sixty seconds with application of water thereto.

8. The process of producing hot pressed primed ligno-cellulosic board comprising hot pressing at a temperature in excess of 400° F. to about 475° F. ligno-cellulosic pulp mat containing a resin, applying a pigmented priming material containing a fusible resin to the hot press board, the temperature of said board less than about 50° F. above the melting point of the resin in said priming material, permitting the priming material to dry by the internal heat of the board, and then reducing the temperaure of the hot pressed board to below 100° F. in less than three minutes by the application of water thereto.

9. The process of producing hot pressed primed ligno-cellulosic board comprising hot pressing at a temperature in excess of about 400° F. to about 475° F. a ligno-cellulosic board containing a fusible resin, applying a pigmented priming material to the hot board, drying the priming material by the internal heat of the board for a period of less than three minutes, and then quickly reducing the temperature of said board in less than about three minutes to below about 100° F. by the application of water thereto.

10. A process of producing hot pressed primed ligno-cellulosic board comprising hot pressing a lignocellulosic mat containing extracted pine wood resin at a temperature within the range of 400° F. to about 475° F.; applying a pigmented priming material containing phenolic resin and a drying oil to the pressed board while hot; drying the primed pressed board by the internal heat of the pressed board and then quickly cooling the board by the application of water to said primed board.

References Cited in the file of this patent

UNITED STATES PATENTS

| | | |
|---|---|---|
| 2,619,681 | Baker et al. | Dec. 2, 1952 |
| 2,654,296 | McCorkle | Oct. 6, 1953 |
| 2,759,837 | Roberts | Aug. 21, 1956 |

FOREIGN PATENTS

| | | |
|---|---|---|
| 509,781 | Belgium | Mar. 31, 1952 |